United States Patent [19]

Schaffner

[11] Patent Number: 4,647,261
[45] Date of Patent: Mar. 3, 1987

[54] CUTTING DEVICE AND METHOD FOR THE PRECISION TRIMMING OF THE EDGE OF A CAST LENS

[75] Inventor: Hans S. Schaffner, Greenwich, Conn.

[73] Assignee: International Hydron Corporation, Woodbury, N.Y.

[21] Appl. No.: 533,478

[22] Filed: Sep. 19, 1983

[51] Int. Cl.$^4$ .................. B23B 1/00; B23B 29/12
[52] U.S. Cl. .................. 409/132; 51/101 LG; 82/1 C; 82/12; 408/180; 408/187; 409/138; 409/181; 409/188; 409/218
[58] Field of Search .............. 409/193, 195, 199, 204, 409/205, 210, 211, 218, 20, 128, 129, 184, 131, 128, 147; 408/111, 113, 114, 156, 159, 180, 187, 192, 2, 16, 7; 82/1.4, 1.5, 12, 17, 20, 16, 11; 51/101 LG, 105 LG, 106 LG, 162, 284 E, 124 L; 425/289, 292, 808; 264/2, 7

[56] References Cited

U.S. PATENT DOCUMENTS

| | | | |
|---|---|---|---|
| 2,369,318 | 2/1945 | Sirp et al. | 82/1.5 X |
| 2,625,061 | 1/1953 | Mansfield | 408/2 |
| 2,661,640 | 12/1953 | Ruegg | 82/1.5 X |
| 3,301,105 | 1/1967 | Morris | 82/11 X |
| 3,514,908 | 6/1970 | Herbert et al. | 82/20 |
| 3,731,363 | 5/1973 | Hall et al. | 250/227 X |
| 3,736,115 | 5/1973 | Blum | 82/20 |
| 3,738,064 | 6/1973 | Szyferblatt | 51/101 LG |
| 3,795,160 | 3/1974 | Janiszewski | 408/82 X |
| 3,832,920 | 9/1974 | Wrue | 82/20 X |
| 3,835,596 | 9/1974 | Wrue | 82/20 |
| 3,896,688 | 7/1975 | Wrue | 82/20 |
| 3,981,210 | 9/1976 | Janiszewski | 82/1.4 |
| 4,016,682 | 4/1977 | Legendre | 51/101 LG X |
| 4,048,879 | 9/1977 | Cox | 408/7 X |
| 4,051,751 | 10/1977 | Estrada | 82/12 |
| 4,084,459 | 4/1978 | Clark | 82/12 X |
| 4,134,315 | 1/1979 | Bendini | 82/12 X |
| 4,274,313 | 6/1981 | Vulic | 82/12 |
| 4,394,099 | 7/1983 | Santinelli | 51/101 LG X |
| 4,420,253 | 12/1983 | Pryor | 408/16 X |
| 4,434,581 | 3/1984 | Spriggs | 82/11 X |
| 4,455,901 | 6/1984 | Council, Jr. | 82/12 |

Primary Examiner—Gil Weidenfeld
Assistant Examiner—Glenn L. Webb
Attorney, Agent, or Firm—Vincent P. Pirri

[57] ABSTRACT

A cutting device and method for the precision trimming of a selected portion of the peripheral edge of a cast lens secured on the external surface of a male mold independent of any eccentricity that may exist between the opening defined in the mold and the outer diameter of the mold.

15 Claims, 7 Drawing Figures

FIG. 7

CUTTING DEVICE AND METHOD FOR THE PRECISION TRIMMING OF THE EDGE OF A CAST LENS

TECHNICAL FIELD

The present invention relates to a cutting device for precision trimming a selected portion of the peripheral edge of a cast lens secured within a flexible circumferential rim on the external surface of a mold. The invention also relates to a method for the economical and precision trimming of a selected portion of the peripheral edge of a cast lens secured within a circumferential rim on the external surface of a mold.

BACKGROUND ART

A widely practiced technique for the manufacture of soft contact lenses involves the latching procedure. This technique has many drawbacks inasmuch as it is a labor intensive operation, requires several steps, is relatively expensive, and the finished lens product is characterized by striations on its optical surfaces. In the lathing technique, an appropriate polymerization medium is first polymerized into a cylindrical shape from which there are cut so-called lens "buttons" or lens blanks, or the lens blanks per se can be made in appropriate molds. The blanks are subjected to a postcure treatment to improve certain of their physical characteristics. A predetermined curved surface is thereafter cut on one face of the blank by using precision lathe machinery and the cut curved surface is polished to an optical surface. Formation of an optical surface on the opposite face of the blank requires adhering the partially cut blank to an arbor or mandrel by means of a waxy substance in a manner that the uncut face of the blank is exposed for the lathing and polishing operations. Thereafter, there are washing and cleaning steps to remove residues from the cutting and polishing procedures and eventually, as with soft contact lenses, soaking in a physiologic solution until osmotic equilibrium is reached at which stage the hydrogel lens attains its final dimensions. This method suffers from the disadvantage of requiring highly skilled artisans for quality production.

In utilizing closed mold system for casting contact lenses, the inevitable shrinkage that occurs on polymerization can result in surface and/or edge irregularity of the cast lenses. With some monomeric materials, the volumetric shrinkage during polymerization can be as high as 22%. This degree of shrinkage will generally prevent satisfactory casting of soft contact lenses where surface finish and sharpe are important. For examle, as taught in U.S. Pat. No. 3,660,545, a polymerizable acrylate, or methacrylate ester mixture held in a closed glass mold invariably would pull away from at least one mold surface and cause the formation of surface voids which render the cast lines unsuitable for use as a contact lens for humans.

A closed mold casting system in which the disadvantage associated with shrinkage of the polymerizable or curable material has been proposed in U.S. Pat. No. 4,121,896 to T. H. Shepherd. The disclosure made in this application, to the extent intended herein, is incorporated by reference as if set out in full text. According to the process described in this U.S. patent, complementing replica male and female mold members each having an optical molding surface are prepared by injection molding of plastic composition in the master mold pairs. The plastic mold members are then longitudinally aligned and used to mold contact lenses, one of the molding surfaces being provided with a flexible circumferential rim which defines the periphery of the resulting lens. The lens-forming polymerizable or curable material which will constitute the lens is charged into the female mold member or portion. The complementing male member or portion is brought into contact with the female mold member so that the flexible rim portion is seated on the opposite molding surface. During molding the lens-forming material contracts causing the flexible rim to flex, inwardly usually, whereby the two mold member move towards each other. Once the molding cycle is completed the mold members are separated and the resulting contact lens is secured within the circumferential rim on the mold. The lens can then be removed in a condition ready for use, except for cleaning and perhaps a buffing of the lens edge.

Although the above-described closed mold casting process does produce precision lenses, time-consuming steps must be taken to oftentimes remove undesirable flash on the peripheral edge of the lenses as by buffing in order to make them commercially acceptable. If a male mold containing the lens is positioned on a revolving mandrel and a conventional cutting tool is employed to trim a selected peripheral edge portion of the lens, then due to the possibility of eccentricity between the opening in the cylindrical mold and the outer diameter of the mold, an asymmetrical trim could be imparted to the lens. This could result in unacceptably soft contact lenses being produced.

OBJECTS OF THE INVENTION

Accordingly, one or more objects will be achieved by the practice of the invention.

Objects of the invention are for the provision of novel cutting devices and novel methods for symmetrically trimming the peripheral edge portion of a cast lens.

Another object of the invention is to provide a novel cutting device employing guiding means associated with cutting means for the precision trimming of a selected portion of the peripheral edge of a soft contact lens.

Yet another object of the invention is to provide a novel cutting device employing guiding means associated with cutting means and utilizing fiber optic means for detecting when the selected portion of the peripheral edge of a cast soft contact lens is in position to be trimmed.

Another additional object of the invention is to provide a novel cutting device employing guiding means associated with cutting means and utilizing air gage sensing means for detecting when the selected portion of the peripheral edge of a cast soft contact lens is in position to be trimmed.

Still another object of the invention is to provide a method for the precision trimming of a selected portion of the peripheral edge of a cast soft contact lens which is not labor intensive or capital intensive, which can be operated in an efficient manner on a continuous basis, which is relatively small in size as to be readily portable and/or obviates various disadvantages of the art.

The foregoing as well as additional objects will become fully apparent from the following description and the accompanying drawings.

DISCLOSURE OF THE INVENTION

The invention relates to a cutting device for trimming a selected peripheral edge portion of a lens secured in a mold which comprises a housing having an extended support member; a cutting means having a cutting edge and said cutting means secured to said support member; said support member having a guiding edge disposed a fixed distance from said cutting edge; and said guiding edge and said cutting edge being cooperatively associated so that when said guiding edge contacts the outer wall of a mold, the cutting edge will be positioned for the precision trimming of an edge portion of a lens secured on the mold.

Through the cooperative association of the guiding edge of the support member and the cutting edge of the cutting means, a symmetrical and precision trimming of a selected portion of the peripheral edge of a lens secured on a mold can be performed. Specifically, when the guiding edge is positioned to contact the outer wall of a cylindrical mold containing a cast lens, the cutting edge will be precisely positioned for trimming a preselected portion of the peripheral edge of a lens secured on the mold. Thus as the mold containing the lens is rotated on a conventional mandrel, the guiding edge will ride on the outer wall of the mold thereby insuring that the cutting edge is positioned for selectively trimming a precise segment of the edge of the lens. This guiding edge and cutting edge arrangement will compensate for any eccentricity that may exist between the opening defined in the mold which is adapted to receive a conventional rotating mandrel and the outer diameter of the mold. Through the use of the guiding edge on the extended support member which slides on the outer wall of the mold, the cutting edge will impart a precision trim to the peripheral edge portion of the lens such that the cut of the lens is concentric with the outer diameter of the lens and independent of any eccentricity that may exist between the opening defined in the mold and the outer diameter of the mold.

Preferably, the extended support member should be pivotable with respect to the housing of the device so that the housing could remain fixed while the extended support member and cutting means secured thereon would be free to follow any run-out created by any eccentricity between the outer diameter of the mold and the hole defined in the center of the mold. Another preferred feature of the invention is to have the cutting means adjustably mounted on the support member so that the distance between the cutting edge and the guiding edge can be adjusted to accommodate different size molds. In addition, the cutting means should be easily disassembled from the cutting device to facilitate the sharpening of the cutting edge when desired or to replace the cutting edge when necessary.

In another embodiment of the invention the cutting edge comprises a sharp segment and a blunt segment such that the sharp segment could be positioned to precision trim the lens while the blunt segment could be positioned to slide upon the circumferential rim of the mold that secures the lens to the mold. When using male molds, the guiding edge of the support member could be appropriately curved to conform to the contour of the wall of the mold so as to facilitate the sliding of the guiding edge on the mold.

An additional embodiment of the invention would entail the use of fiber optics means or air gage sensing means in the novel cutting device to detect when the cutting edge is properly distanced from the lens so that the extremely accurate trimming of the lens edge can be accomplished. Since the mold will be rotating at the same speed as the mandrel, the detection of the precise position that trimming of the lens will occur by the fiber optic means or air gage sensing means will provide a signal which will cause the advancing cutting device to stop whereupon the lens trimming operation will be accomplished. The mold can be taken off the mandrel and the lens can then be removed in a condition ready for use, except for cleaning and perhaps a buffing of the lens edge. Due to the small size of contact lenses and specifically to the extremely small size of the edge portion of the lens to be trimmed, it is rather difficult to determine when and if trimming has been completed. Advantageously by utilizing the use of fiber optic means or air gage sensing means as described above, the cutting device can be used on a continuous operation to produce lenses to exact physical specifications in a minimum of time since the fiber optic means or air gage sensing means will insure when the trimming of the lens has commenced.

Conventional fiber optic means can be used in conjunction with the novel cutting device of this invention. Generally, the distal end of a fiber bundle (for example, from an optical extender coupled to a fiber optic probe) is placed in close proximity to where the reflected surface of the lens in the mold would be positioned to be trimmed by the cutting edge of the cutting means. Light traveling down the fiber bundle is reflected from the lens surface back onto receive fibers of the bundle located in a conventional probe tip and such reflection is detected by a photo sensor. The amount of reflected light is related to the distance between the face of the fibers and the reflected surface, the acceptance angle, or numerical aperture of the fibers, and the reflectivity of the surface. Accordingly, the fiber optic means can be used as a convenient proximitor for generating a signal to stop the advancing cutting device when the lens surface is precisely positioned for trimming by the cutting edge of the cutting means. A signal can be generated to automatically remove the cutting device to another rotating mold on a mandrel thus providing a continuous operation for trimming the edge of cast lenses.

Conventional air gage sensing means can be used in conjunction with the novel cutting device of this invention. Commercial air gage sensing means can be obtained from Edmunds Manufacturing Company, Farmington Industrial Park, Farmington, Conn. 06032. Generally, air from a regulated supply will flow through a restriction device coupled to an output nozzle. When an object is placed in front of the nozzle and slowly brought towards of the nozzle, the air flow will be restricted and pressure down stream of the restriction device will gradually build up until it is the same as the regulated supply. The exact distance of the object from the end of the nozzle can be detected by measuring the change of air flow and the change of pressure. A summary of air gage sensing means is disclosed in a publication titled Gage Page by Edmunds Manufacturing Company, Farmington Industrial Park, Farmington, Conn. 06032, and the disclosure made therein is fully incorporated herein by reference as if set out in full text. Accordingly, the air gage sensing means can be used as a convenient proximeter for generating a signal to stop the advancing cutting device when the lens surface is precisely positioned for trimming by the cutting edge of the cutting means. This sensing means can also be used to provide an automatic system for trimming the edge of cast lenses.

Another aspect of the invention is directed to a method for trimming a selected peripheral edge portion of a lens mounted on a mold comprising the steps:

(a) placing a male mold such as a cylindrical or tapered mold, containing an exposed cast lens secured on one end of the mold on a rotatable mandrel;

(b) positioning a cutting edge of a cutting tool adjacent a guiding edge of a support member such that the cutting edge is positioned a predetermined distance from the guiding edge; and (c) rotating the mandrel containing the mold with the lens and contacting the guiding edge of the support member to the revolving outer wall of the male mold thereby positioning the cutting edge against the peripheral edge of the lens for the precision trimming of a selected edge portion of the lens secured on the mold.

The above method can be modified by employing fiber optic means for detecting when the lens is positioned for trimming by the cutting means and then removing the mold from the cutting means after a predetermined fixed time that would insure that the lens had been completely trimmed. By coupling the fiber optic means to appropriate power operated machinery, a fixed time period after a signal is detected from the fiber optic means, the mold could be automatically removed from the cutting means and replaced by another mold containing a lens to be trimmed. The molds can be arranged in a carousel type arrangement and thus be advanced and removed from the cutting means on a continuous basis.

BRIEF DESCRIPTION OF THE DRAWING

The present invention will become more apparent from the following description thereof when considered together with the accompanying drawing which is set forth as being exemplary of embodiments of the present invention and is not intended in any way to limited thereof and wherein.

Figure 1:
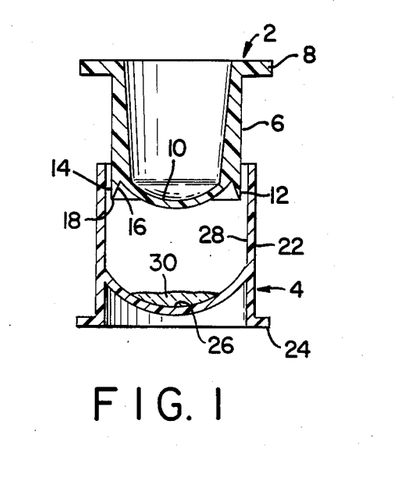
FIG. 1 is a side elevation in cross section of a convex male molding surface with a flexible rim attached thereto and a concave female molding surface.

The mold comprises two portions, namely a male portion 2 and a female portion 4. The male mold 2 comprises a substantially cylindrical support segment 6 having, optionally, attached to the upper end thereof a rim 8. Cylindrical support segment 6 defines an opening which is adapted to fit over a mandrel as will be discussed later. Cylindrical support segment 6 is closed by male molding surface 10 circumferentially attached to the bottom of cylindrical support segment 6. The curvature of male molding surface 10 is predetermined to comply with the optical requirements of the lens to be produced. The curvature may be entirely spherical or aspherical or combinations of both. Male molding surface 10 can be toric in the central or optical zone; however, the peripheral portion must be symmetrical with respect to the central axis of the lens in order to achieve proper seating or mating with rim 8. As shown in FIG. 1, a flexible circumferential ring 12 is located around male molding surface 10 and is integral therewith. Ring 12 comprises an outer surface 14, an inner surface 16 and a contact edge 18.

The female mold 4 includes a cylindrical support member 22 set, optionally, in a base 24 set circumferentially thereto and a female molding surface 26 set internally in cylindrical support member 22. As with respect to male molding surface 10 the curvature of female molding surface 26 is pre-determined and may vary in the same manner as the curvature of mold surface 10. The only limitation placed upon the mutual relationship of curvature of male molding surface 10 and female molding surface 26 is that the article to be molded therebetween shall have the general characteristics suitable for a contact lens, namely that the article produced thereby shall have a concave surface which will contact, when in use, the eyeball of the user and a second, convex surface, which shall contact the internal portion of the eyelid of the user.

Figure 2:
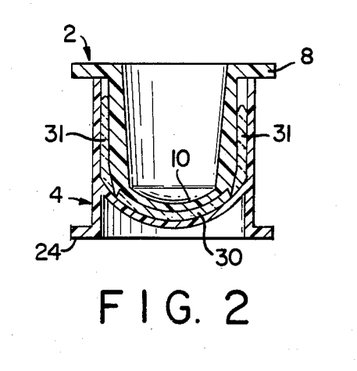
FIG. 2 is a side elevation in cross section illustrating a mating of the molds of FIG. 1 and wherein the rim is shown in flexed form.

During the operation of the process, a polymerizable or curable material 30 which will constitute the contact lens is placed on female molding surface 26 of female mold 4. The male mold 2 is positioned into the female mold 4 in such a manner that contact edge 18 of flexible circumferential ring 12 in this case attached circumferentially around the male molding surface 10 just touches female molding surface 26 as shown in FIG. 2. At this point excess molding material 31 is squeezed out between the outer edge of support segment 6 of male mold 2 and the inner support wall 28 of female mold 4. In the embodiment shown in the FIGS. 1 and 2, no runoff channels are shown or provided. Nevertheless, the provisions of molds having such channels can be used. They are sometimes not utilized since the provision of such molds required an additional, and more expensive, step in manufacturing the molds and this provision has not been found to be needed in most applications.

The drawings herein are not to scale, in particular, with regard to the flexible circumferential ring 12 and the clearance between male mold 2 and female mold 4.

Figure 3:
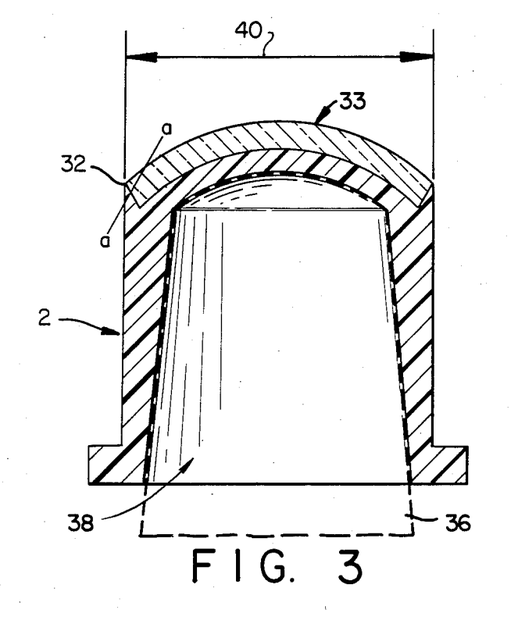
FIG. 3 is an enlarged side elevation in cross section of the male mold of FIG. 2 shown inverted.

The mold assembly containing the molding material is then subjected to the molding processes. During the molding stage, the polymerizable or curable molding material will contract as much as 20% of the volume of the molding material originally present between surfaces 10, 16 and 26. Since such a contraction takes place in a totally enclosed space, a potential vacuum is formed which will be counteracted by external atmospheric pressure causing the male molds 2 and female mold 4 to move towards each other. The flexibility of ring 12 permits the molds to thus approach each other more closely due to the flexing of ring 12 in a uniform manner. If desired, external pressure can be applied to ensure that the molding surfaces do approach each other as closely as possible. However, the application of such external pressure is optional and, while in certain cases, may give rise to improved results, the operation of the process will proceed without said external pressure under appropriate activity conditions. Upon completion of the molding step, the molds are separated. FIG. 3 shows an inverted enlarged view of the male mold 2 containing a cast lens 33. Peripheral edge 32 with undesirable flash is removed by the cutting tool generally along line a—a. Slight buffing may be desirable after the cutting operation. Due to the small size and transparent characteristic of the lens, the trimming of the edge portion of the lens is preferably done while the lens is secured within the ring 12 of male mold 2. However, when male mold 2 is placed on a conventional mandrel 36 (shown in outline form in FIG. 3) and a conventional cutting tool is used to trim the edge, any eccentricity between opening 38 defined in male mold 2 and the outside diameter 40 of mold 2 will result in an asymmetrical trimming of the lens. This could result in unacceptable contact lens for human use. Generally, since the thickness of the peripheral edge of the lens could be about 0.087 inch, precision cutting is necessary to trim only a selected portion of the edge.

Figures 4, 5, 6:
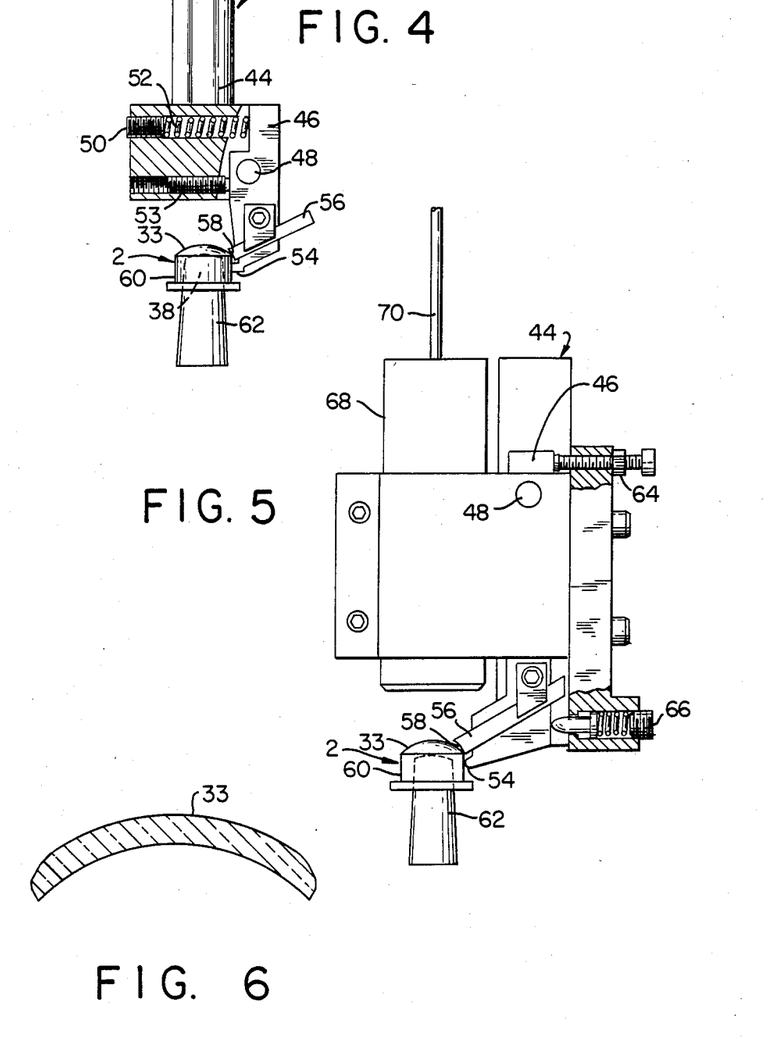
FIG. 4 is a side elevation partly in cross section of the novel cutting device of this invention.
FIG. 5 is a side elevation partly in cross section of another embodiment of the invention which comprises the novel cutting device which includes a fiber optic sensing device.
FIG. 6 is a side elevation in cross section of a cast contact lens that was trimmed by the cutting device of this invention.

FIG. 4 shows one embodiment of a cutting device 42 of this invention that can compensate for any eccentricity between the opening 38 in male mold 2 and the outside diameter 40 of male mold 2. Specifically, cutting device 42 includes a housing 44 having secured thereto support member 46 pivotable about pin 48. Extended support member 46 is spring biased above pin 48 by means of a set screw 50 coupled to spring 52. To prevent extended support member 46 from pivoting about pin 48 due to spring 52, a stop screw 53 is disposed below pin 48. Thus extended support member 46 can only pivot counter clockwise against spring 52.

Disposed at the lower tip of extended support member 46 is an extended guiding edge 54. Adjustably secured above guiding edge 54 is a cutting tool 56 having a cutting edge 58. The cutting tool 56 is adjusted such that the distance between the guiding edge 54 and cutting edge 58 will allow the guiding edge 54 to ride on wall 60 of male mold 2 and position cutting edge 58 to impart an exact trim to the peripheral edge of cast lens 33 secured on male mold 2. With male mold 2 placed on a rotatable mandrel 62, the positioning of male mold 2 to cutting device 42 will cause the guiding edge 54 to ride on outer wall 60 of male mold 2 while cutting edge 58 imparts the necessary trimming to the edge of lens 33. Since the support member is spring loaded and has a pivotal point, guiding edge 54 and cutting edge 58 will follow any run-out created by the eccentricity between the outside diameter 40 of male mold 2 and opening 38 defined in male mold 2. Thus the trim made on the periphery of lens 33 will be concentric with the outside diameter of the mold and thereby the outside diameter of the lens.

Although not shown, cutting edge 58 is provided with a sharp segment for trimming the lens. Guiding edge 54 can be straight or appropriately curved to conform to the contour of the cylindrical wall of male mold 2 to facilitate sliding thereon and provide greater stability.

FIG. 5 shows another embodiment of a novel cutting device of the invention employing some similar elements which are identified with the same reference numbers. As shown, a stop screw 64 is disposed above pin 48 and prevents extended support member 46 from pivoting clockwise. Below pin 48 is a conventional spring plunger 66 that biases extended support member 46 against counter clockwise rotation. Thus support member 46 can only be pivoted counter clockwise against the force of spring plunger 66. In this embodiment, a conventional optical extender 68 coupled to a fiber optic probe 70 is secured above cutting tool 56 and positioned so that light can be directed to the surface of lens 33. Knowing the exact position where male mold 2 should be for precise trimming of the lens, the fiber optics means (68-70) is calibrated to deliver a signal when the light reflected from the lens indicates that the lens is properly positioned to be trimmed. With male mold 2 revolving on rotatable mandrel 62, a selected time period after detecting the signal from the fiber optic means and the stopping of the advancing of the cutting device, will insure that the cutting operation has been completed. It is within the scope of this invention to have the signal from the fiber optic means stop the advancing cutting device and then after a preset time generate another signal to automatically remove the cutting device from the lens and position the cutting device adjacent to another mold containing a lens to be trimmed.

After trimming is completed, lens 33 is generally buffed and then removed from the mold. A lens 33 is shown in FIG. 6 after being removed from the mold.

Figure 7:
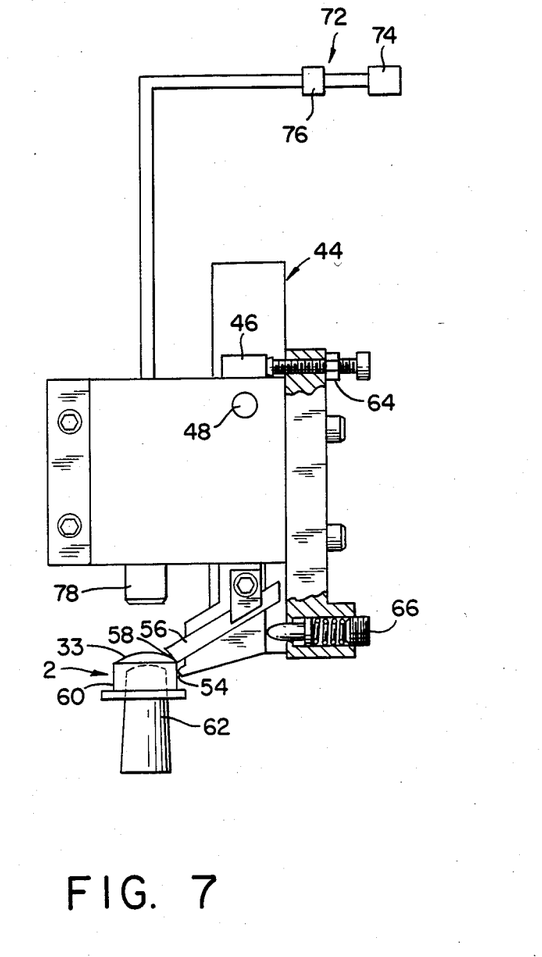
FIG. 7 is a side elevation partly in cross section of another embodiment of the invention which comprises the novel cutting device which includes a air gage sensing means.

FIG. 7 shows the preferred embodiment of the invention employing some similar elements which are identified with the same reference numbers. As shown, a stop screw 64 is disposed above pin 48 and prevents extended support member 46 from pivoting clockwise. Below pin 48 is a conventional spring plunger 66 that biases extended support member 46 against counter clockwise rotation. Thus support member 46 can only be pivoted counter clockwise against the force of spring plunger 66. In this embodiment, a conventional air gage sensing means 72, of the type supplied by Edmunds Manufacturing Company, Farmington Industrial Park, Farmington, Conn. 06032, is shown as comprising a air regulator 74 coupled to restriction means 76 (for regulating the flow of gas) which is turn is coupled to nozzle 78. Nozzle 78 is positioned so that air can be directed to the surface of lens 33. Using conventional means to measure the change of air flow and change of pressure in air gage sensing means 72 due to the placement of lens 33 in front of nozzle 78, the precise location of lens 33 from the nozzle can be determined. Once lens 33 is precisely positioned to be trimmed by the cutting device a signal can be generated to stop the advancement of the cutting device. With male mold 2 revolving on rotatable mandrel 62, a selected time period after detecting the signal from air gage sensing means 72, which indicates that the lens is in position to be trimmed, will insure that the cutting operation has been completed. It is within the scope of this invention to have the signal from air gage sensing means 72 stop the advancing cutting device and then after a preset time generate another signal to automatically remove the cutting device from the lens and position the cutting device adjacent another mold containing a lens to be trimmed. As stated above, after trimming is completed, lens 33 is generally buffed and then removed from the mold. A lens 33 is shown in FIG. 6 after being removed from the mold.

The molds are themselves preferably manufactured from thermoplastic materials, for example low density polyethylene or polypropylene. These and other suitable materials are described in U.S. Pat. Nos. 4,208,365 and 4,121,896, the disclosures of which are fully incorporated herein by reference as if set out in full text.

The process of the invention is not limited to trimming soft plastic contact lenses, i.e., hydrogels and their hydrated state, although these are preferred articles. Also included for trimming are the hard or rigid contact lenses as well as flexible, hydrophobic truncated contacted lenses.

The novel process results in advantages over prior art methods in that a contact lens is cast directly from the desired lens-forming material and then edge trimmed using the novel device of this invention, polishing of the optical surfaces is not required although only minimum finishing or buffing of the lens edges may be required in some applications. The overall manufacturing of finished lenses using the novel cutting device is far less labor intensive than with prior procedures, e.g., lathe procedure. As with most soft lenses, the lens will be washed with water to remove any catalyst residue and unreacted monomer, then equilibrated in aqueous or saline solution to attain their final dimensions.

The liquid lens-forming mixture can comprise monomer, prepolymer or vulcanizable components. Particular suitable components are hydrophilic monomers preferably including those which form slightly or moderately crosslinked, three dimensional networks such as those disclosed in U.S. Pat. No. 3,822,089. Illustrative hydrophilic monomers include water soluble monoesters of an acrylic acid or methacrylic acid with an alcohol having an esterifiable hydroxyl group and at least one additional hydroxyl group such as the mono- and polyalkylene glycol monoesters of methacrylic acid and acrylic acid, e.g., ethylene glycol monomethacrylate, ethylene glycol monoacrylate, diethylene glycol monomethacrylate, diethylene glycol monoacrylate, propylene glycol monomethylate, dipropylene glycol monoacrylate, and the like; the N-alkyl and N,N-dialkyl substituted acrylamides and methacrylamides such as N-methylacrylamide, N,N-dimethylacrylamide, N-methylmethacrylamide, N,N-dimethylmethacrylamide, and the like; N-vinylpyrrolidone; the alkyl substituted N-vinyl pyrrolidones, e.g., methyl substituted N-vinylpyrrolidone; glycidyl methacrylate; glycidyl acrylate; the unsaturated amines; the alkyl ethyl acrylates; solubilized collagen; mixtures thereof; and others known to the art.

Hydrophilic monomers particularly useful in the practice of the invention to manufacture contact lenses include hydrophobic acrylic esters, suitably lower alkyl acrylic esters, preferably wherein the alkyl moiety contains 1-5 carbon atoms, such as methyl acrylate or methacrylate, ethyl acrylate or methacrylate, n-propyl acrylate or methacrylate, isopropyl acrylate or methacrylate, isobutyl acrylate or methacrylate, n-butyl acrylate or methacrylate, or mixtures thereof.

Other suitable monomers include the ethylenically unsaturated monocarboxylic acid esters, in particular, the methacrylic and acrylic acid esters of siloxane monomers and polymers with/without a pendant hydroxyl group. These monomers are well documented in the contact lens art; see, for example, U.S. Pat. Nos. 4,139,548; 4,235,985; 4,152,508; 3,808,178; 4,139,692; 4,248,989; and 4,139,513. The disclosure of the foregoing illustrative patents, to the extent intended herein, are incorporated by reference as if set out in full text.

Among the preferred monomeric mixtures are those which contain at least one alkylene glycol monoester of methacrylic acid, especially ethylene glycol monomethacrylate, and at least one crosslinking monomer such as the alkylene glycol diester of methacrylic acid, especially ethylene glycol dimethacrylate. Such mixtures may contain other polymerizable monomers, desirably in minor amounts such as N-vinylpyrrolidone, methyl methacrylate, acrylamide, glycidyl methacrylate, N-methylacrylamide, diethylene glycol monomethacrylate, and others illustrated above.

The above illustrated monomers, monomeric mixtures including mixtures of hydrophobic and hydrophilic reactants, may be further admixed with a minor proportion of di- or polyfunctional polymerizable species to cause crosslinking of the polymeric matrix as polymerization or curing proceeds. Examples of such di- or polyfunctional species include: divinylbenzene, ethylene glycol diacrylate or methacrylate, propylene glycol diacrylate or methacrylate, and the acrylate or methacrylate esters of the following polyols: triethanolamine, glycerol, pentaerythritol, butylene glycol, diethylene glycol, triethylene glycol, tetraethylene glycol, mannitol, sorbitol and the like. Other crosslinking monomers can be illustrated by N,N-methylene-bis-acrylamide or methacrylamide, sulfonated divinylbenzene, and divinylsulfone.

Additional lens-forming materials which are suitable in the fabrication of contact lenses are illustrated by one or more of the following U.S. Pat. Nos.: 2,976,576; 3,220,960; 3,937,680; 3,948,871; 3,949,021; 3,983,083; 3,988,274; 4,018,853; 3,875,211; 3,503,942; 3,532,679; 3,621,079; 3,639,524; 3,700,761; 3,721,657; 3,758,448; 3,772,235; 3,786,034; 3,803,093; 3,816,571; 3,940,207; 3,431,046; 3,542,461; 4,055,378; 4,064,086; and 4,062,627.

The polymerization reaction can be carried out in bulk or with an inert solvent. Suitable solvents include water; organic solvents such as water-soluble lower aliphatic monohydric alcohols as well as polyhydric alcohols, e.g., glycol, glycerol, dioxane, etc.; and mixtures thereof. In general, the solvent comprises a minor amount of the reaction medium, i.e., less than about 50 weight percent.

Polymerization of the lens-forming mixture may be carried out with free radical catalysts and/or initiators of the type in common use in vinyl polymerization. Such catalyst species can include the organic peroxides, the alkyl percarbonates, hydrogen peroxides, and inorganic materials such as ammonium, sodium, or potassium persulfate. Polymerization temperatures can vary from about 20° C., and lower, to about 100° C., and higher.

Polymerization of the monomer or prepolymer material can also be effected using, for example, radiation (U.V., X-ray, microwave, or other well-known forms of radiation) with/without the presence of well-known initiator(s) and/or catalyst(s).

A procedure for the making of molds and formation of lenses suitable for use with the cutting device of this invention is described in U.S. Pat. No. 4,121,896, the disclosure of which is fully incorporated herein by reference as if set out in full text. As disclosed in this reference, the design of lenses by the cast system employing a mold with a circumferential rim is not restricted to any particular set of parameters. Both anterior and posterior surfaces of the lenses may consist of entirely spherical curves or aspherical curves or combinations of both. For example, the central position of the lens may consist of spherical curves on both the anterior and posterior surface, and the periphery of the anterior surface may consist of a steeper or flatter spherical curve, and the periphery of the posterior surface may be aspheric to achieve improved fitting characteristics.

In addition, one or both of the surfaces may be toric in the central or optical zone; however, the peripheral portion must be symmetrical with respect to the central axis of the lens to achieve proper seating or mating of the integral rim.

EXAMPLE 1(a)

Formation of Molds

Female high density polyethylene molds were prepared by injection molding on a convex male steel mold having an outside diameter of 12.0 mm, a central radius of curvature of 7.50 mm with a chord diameter of 10.0 mm and a peripheral radium of curvature of 7.00 mm. Male high density polyethylene molds were prepared by injection molding in a concave steel mold having an inside diameter of 11.9 mm, central radius of 7.00 mm with a chord diameter of 11.0 mm, and a peripheral curve having a radius of 12.5 mm. The periphery of the curved mold surface was recessed to provide a periphery rim 0.01 mm wide at the apex extending 0.12 mm from the edge of the curve. Radiuscope measurement showed the central radius of curvature of the female concave molds was 11.8 mm, and the central radius of curvature was 6.95±0.03 mm.

EXAMPLE 1(b)

Formation of Lens

A concave female mold was placed on a flat surface with the cavity projecting upward. A solution consisting of carefully purified 2-hydroxyethyl methacrylate, 100 parts; distilled water, 30 parts; ethylene glycol dimethyl ether, 25 parts; triethylene glycol dimethacrylate, 0.4 parts; an di-isopropyl percarbonate, 0.2 parts; was prepared by thorough mixing. One-half ml. of the solution was placed in the female mold, and the male mold half was slowly inserted to displace excess solution and to displace any bubbles. Slight pressure was applied on the male half to ensure seating of the rim. The filled mold was then placed in a circulating air oven at 45° C. for 1 ½ hours. After cooling to room temperature, the mold was opened, the "ring" of polymerized material filling the cylindrical void in the annulus between the mold halves was removed, and the flexible lens adhered lightly to the male half of the mold.

The male mold containing the formed lens secured within the circumferential rim was inverted and placed on a rotatable mandrel. A cutting device as basically shown in FIG. 4 was positioned adjacent to the revolving mandrel and the guiding edge was positioned to contact the cylindrical wall of the mold. This insured that the cutting edge was precisely positioned to trim a selected area of undesirable flash at the peripheral edge of the lens s basically shown in FIG. 3. After the trimming and buffing operations were completed, the lens was easily removed from the mold. The finished contact lens was placed in a physiological solution. As measured on a Nikon Vertexometer, the lens had an optical power of −3 diopters. The lens had a center thickness of 0.04 mm and an edge thickness of 0.09 mm. Using the novel cutting device of this invention, the edge of the lens was reduced in thickness by 0.04 mm thereby providing a tapered edge portion for the lens without sharp points that could irritate the eye of the user.

What is claimed is:

1. A cutting device for trimming a selected peripheral edge portion of a contact lens secured in a mold which comprises a housing having an extended support member; a cutting means secured to said housing and having a cutting edge; said support member having a guiding edge disposed a fixed distance from said cutting edge; said guiding edge and said cutting edge being cooperatively associated so that when said guiding edge contacts the outer wall of said mold, said cutting edge will be positioned for the precision trimming of an edge portion of said contact lens secured in said mold so that during the precision trimming of said contact lens said guiding edge will contact the outer wall of said mold thereby continuing to guide said cutting edge during the trimming of said contact lens.

2. The cutting device of claim 1 wherein the cutting means is secured to the support member and wherein said device has means for pivoting the support member about an axis through the housing.

3. The cutting device of claim 2 having means for restricting the pivoting of the support member in one direction and means for allowing the support member to pivot in the opposite direction upon the application of a force.

4. The cutting device of claim 1 having fiber optic means disposed in the housing and associated with at least the cutting edge and being adapted to indicate when a lens is accurately positioned to be trimmed by the cutting edge of the cutting means.

5. The cutting device of claim 1 having air gage sensing means disposed in the housing and associated with at least the cutting edge and being adapted to indicate when a lens is accurately positioned to be trimmed by the cutting edge of the cutting means.

6. The cutting device of claim 1 wherein the guiding edge is straight or curved.

7. The cutting device of claim 1 wherein the cutting means is adjustably mounted on the support means.

8. The cutting device of claim 3 having fiber optic means disposed in the housing and associated with at least the cutting edge and being adapted to indicate when a lens is accurately positioned to be trimmed by the cutting edge of the cutting means.

9. The cutting device of claim 3 having air gage sensing means disposed in the housing and associated with at least the cutting edge and being adapted to indicate when a lens is accurately positioned to be trimmed by the cutting edge of the cutting means.

10. The cutting device of claim 3 wherein the cutting means is adjustably mounted on the support means.

11. The cutting device of claim 8 wherein the cutting means is adjustably mounted on the support means.

12. The cutting device of claim 9 wherein the cutting means is adjustably mounted on the support means.

13. A method for trimming a selected peripheral edge portion of a contact lens mounted on a mold comprising the steps:
  (a) placing a male mold containing an exposed cast contact lens secured on one end of the mold on a rotatable mandrel;
  (b) positioning a cutting edge of a cutting tool adjacent a guiding edge of a support member such that the cutting edge is positioned a predetermined distance from the guiding edge; and
  (c) rotating the mandrel containing the mold with the exposed lens and contacting the guiding edge of the support member to the revolving outer wall of the male mold on the mandrel thereby positioning the cutting edge of the cutting tool to trim a selected edge portion of the lens secured on the mold independent of any eccentricity that may exist between the opening defined in the mold which accommodates the mandrel and the outer diameter of the mold.

14. The method for trimming a selected peripheral edge portion of a lens as in claim 13 having the following steps:
   (d) detecting through the use of fiber optic means when the lens is appropriately positioned to be trimmed by the cutting edge of the cutting tool; and
   (e) removing the cutting tool from the rotating mold on the mandrel after a suitable time period from step (d) thereby insuring that the trimming operation is completed.

15. The method for trimming a selected peripheral edge portion of a lens as in claim 13 having the following steps:
   (a) detecting through the use of air gage sensing means when the lens is appropriately positioned to be trimmed by the cutting edge of the cutting too; and
   (b) removing the cutting tool from the rotating mold on the mandrel after a suitable time period from step (a) thereby insuring that the trimming operation is completed.

* * * * *